(12) United States Patent
Vivanco et al.

(10) Patent No.: US 8,983,496 B1
(45) Date of Patent: Mar. 17, 2015

(54) SYSTEMS AND METHODS OF MANAGING TRACKING AREA UPDATES

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 91 days.

(21) Appl. No.: 13/871,921

(22) Filed: Apr. 26, 2013

(51) Int. Cl.
*H04W 24/00* (2009.01)
*H04W 4/02* (2009.01)

(52) U.S. Cl.
CPC ..................... *H04W 4/02* (2013.01)
USPC ...................................... 455/456.1

(58) Field of Classification Search
CPC .......... H04W 8/02; H04W 8/06; H04W 68/02
USPC ...................................... 455/456.1
See application file for complete search history.

(56) References Cited

U.S. PATENT DOCUMENTS

| 6,111,539 | A  | * | 8/2000 | Mannings et al. | 342/357.31 |
| 8,265,009 | B2 |   | 9/2012 | Kamalaraj et al. | |
| 2008/0102896 | A1 | * | 5/2008 | Wang et al. | 455/560 |
| 2009/0098884 | A1 | * | 4/2009 | Casati et al. | 455/456.1 |
| 2011/0096731 | A1 |   | 4/2011 | Kamalaraj et al. | |
| 2012/0195255 | A1 |   | 8/2012 | Nylander et al. | |
| 2014/0235262 | A1 | * | 8/2014 | Cho et al. | 455/453 |

* cited by examiner

*Primary Examiner* — Marisol Figueroa

(57) ABSTRACT

In systems and methods of managing tracking area updates, tracking area update messages received from a wireless device are monitored, where the tracking area update messages are received from a wireless device when the wireless device changes between communicating over a first channel associated with a first tracking area identifier and a second channel associated with a second tracking area identifier. The first tracking area identifier comprises a unique tracking area code and a first network identifier, and the second tracking area identifier comprises the unique tracking area code and a second network identifier. When a number of the tracking area update messages received from the wireless device meets a message threshold, the wireless device is instructed to not send a next tracking area update message.

17 Claims, 6 Drawing Sheets

SYSTEMS AND METHODS OF MANAGING TRACKING AREA UPDATES

TECHNICAL BACKGROUND

A wireless device in communication with a communication system can enter a low power or idle mode, for example, to conserve network resources as well as to conserve power storage on the wireless device. When the wireless device is in idle mode, the wireless device typically is not in continuous or active communication with the communication system. In order to notify a wireless device which is in idle mode of the arrival or availability of data for the wireless device, a last known network connection of the wireless device can be stored in the communication system. For example, a controller node, such as a mobility management entity or other controller element of the communication system, can store a last known access node with which the wireless device was in communication. Further, access nodes can be organized into groups of access nodes which can be used to send a notification to the wireless device in the event that the wireless device cannot be located at the last known access node. Examples of such access node groups comprise a tracking area and a routing area. A wireless device can notify the communication system when it moves to a new tracking area by sending a tracking area update or similar message. Tracking area update messages consume network resources, and as a number of tracking area update messages increase, the consumption of network resources increases as well.

OVERVIEW

In operation, tracking area update messages received from a wireless device are monitored. The tracking area update messages are received from a wireless device when the wireless device changes between communicating over a first channel associated with a first tracking area identifier and a second channel associated with a second tracking area identifier. The first tracking area identifier comprises a unique tracking area code and a first network identifier, and the second tracking area identifier comprises the unique tracking area code and a second network identifier. When a number of the tracking area update messages received from the wireless device meets a message threshold, the wireless device is instructed to not send a next tracking area update message.

DETAILED DESCRIPTION

Figure 1:
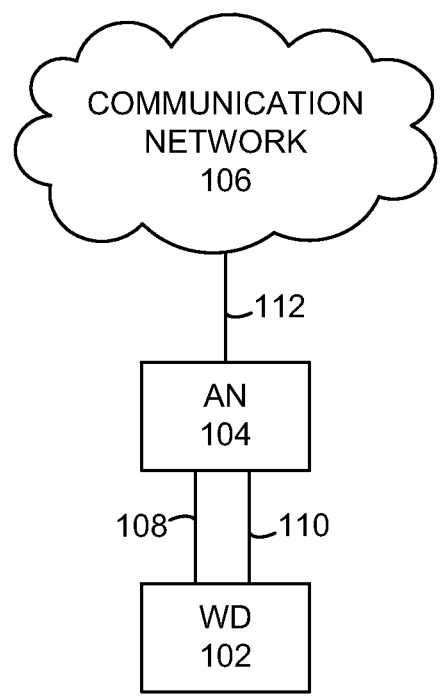
FIG. 1 illustrates an exemplary communication system for managing tracking area updates.

FIG. 1 illustrates an exemplary communication system 100 for managing tracking area updates comprising wireless device 102, access node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication links 108 and 110. Communication links 108 and 110 can comprise a first channel and a second channel, respectively. In an embodiment, communication link 108 and/or the first channel can be associated with a first network operator, and communication link 110 and/or the second channel can be associated with a second network operator.

Access node 104 is a network node capable of providing wireless communications to wireless device 102, and can be, for example, a base transceiver station, a radio base station, an eNodeB device, or an enhanced eNodeB device. Access node 104 can be a member of a group of access nodes, such as a tracking area or a routing area. A tracking area or routing area (referred to hereafter as a tracking area for conciseness) can be used to send a notification message to wireless device 102. For example, when wireless device 102 enters an idle mode, wireless device 102 may not be in active communication with communication system 100. When data arrives for, or is available for, wireless device 102, a notification message can be sent to wireless device 102 through the access nodes of the tracking area. Access node 104 is in communication with communication network 106 over communication link 112.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice and other information, for example, to support voice and data communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise additional base stations, controller nodes, telephony switches, internet routers, network gateways, computer systems, communication links, or some other type of communication equipment, and combinations thereof.

Communication links 108, 110, and 112 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobility management entities, mobile switching centers, dispatch application processors, home subscriber services, and location registers such as a home location register or visitor location register. Furthermore, other network elements may be present to facilitate communication between access node 104 and communication network 106 including additional processing nodes, routers, gateways, and physical and/or wireless data links for carrying data among the various network elements.

Wireless device 102 can enter into a lower power state, such as an idle mode or a sleep mode, in which the wireless device is not in continuous communication with an access node. In order to notify wireless device 102 which is in idle mode of the arrival or availability of data for wireless device 102, a last known network connection of the wireless device can be stored in the communication system. For example, a controller node, such as a mobility management entity or other controller element of the communication system, can store a last known access node 104 with which the wireless device was in communication. In addition, access nodes (including access node 104) can be organized into groups of access nodes (such as a tracking area) which can be used to send a notification to the wireless device in the event that the wireless device cannot be located at the last known access node. A tracking area typically comprises a group of access nodes which are associated with an identifier such as a tracking area code. When a message such as data arrives for wireless device 102 when it is in idle mode, a first notification message (such as a paging message) can be sent to the access node most recently in communication with the wireless device (e.g., access node 104). When wireless device 102 does not respond to the first notification aging message within a predetermined period of time, a second notification message can be sent to all of the access nodes in the tracking area.

When wireless device 102 moves from a first tracking area to a second tracking area, wireless device 102 can send a tracking area update (TAU) message to update the communication system of its new tracking area. The tracking area can be determined by wireless device 102 based on information transmitted by an access node. For example, tracking area information (such as a tracking area identifier (TAI) or similar information) can be broadcast by each access node, and can be received by wireless device 102 even when wireless device 102 is in idle mode. Based on the tracking area information, wireless device 102 can determine whether an access node is associated with a new tracking area, and can also determine based on the tracking area information whether to send a TAU.

When a wireless device is highly mobile, the wireless device may communicate with access nodes associated with two or more tracking areas in a relatively short period of time. Additionally, or alternatively, a wireless device may also communicate with access nodes associated with two or more network operators (e.g., different communication networks) in a relatively short period of time. Where the access networks of two or more network operators are operated in substantially the same geographic area (for example, where networks overlap, or where access nodes are in proximity, or co-located) a wireless device may not be highly mobile, and yet make switch communications from one network to another network. In each case, the wireless device may receive different tracking area information, and thus a wireless device may send a TAU each time the wireless device changes tracking areas and/or networks of different operators. As a number of TAUs increase, a burden on wireless communication resources and backhaul communication resources increases.

In operation, tracking area update messages received from wireless device 102 are monitored. The tracking area updates messages are received when wireless device 102 changes between communicating over a first channel (communication link 108) associated with a first tracking area identifier comprising a unique tracking area code and a first network identifier and communicating over a second channel (communication link 110) associated with a second tracking area identifier comprising the unique tracking area code and a second network identifier. When a number of the tracking area update messages received from wireless device 102 meets a message threshold, wireless device 102 is instructed to not send a next tracking area update message.

Figure 2:
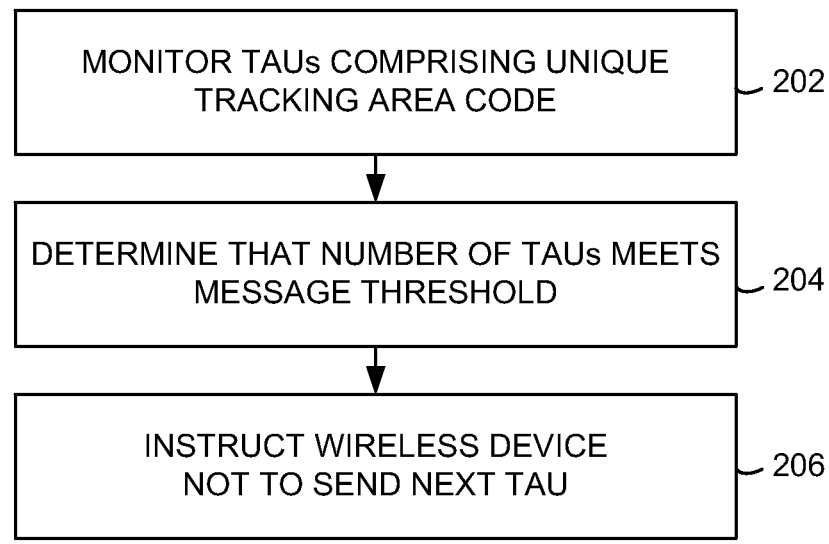
FIG. 2 illustrates exemplary tracking areas.

FIG. 2 illustrates an exemplary method of managing tracking area updates. In operation 202, tracking area update messages received from a wireless device are monitored. The tracking area update messages can be received when the wireless device changes between communicating over a first channel (communication link 108) associated with a first tracking area identifier comprising a unique tracking area code and a first network identifier and communicating over a second channel (communication link 110) associated with a second tracking area identifier comprising the unique tracking area code and a second network identifier.

Figure 3:
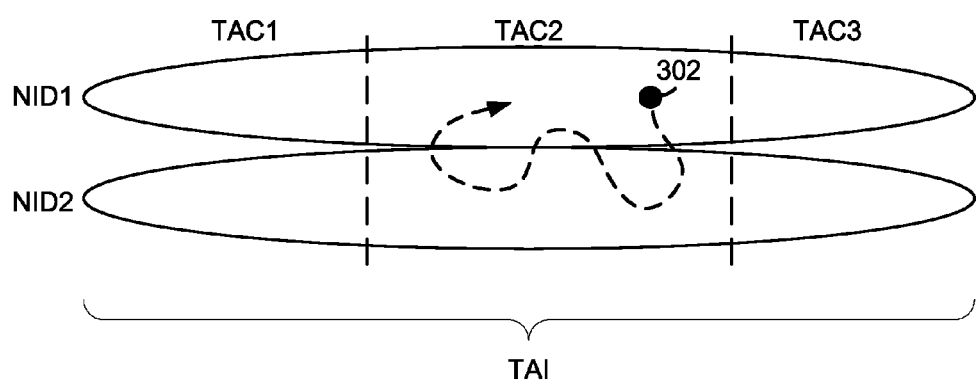
FIG. 3 illustrates an exemplary method of managing tracking area updates.

For example, as a wireless device which is in idle mode moves geographically, the wireless device can communicate with different access nodes. As another example, a wireless device may switch from communicating with one communication network to communicating with another communication network. Each access node typically transmits a tracking area identifier (TAI) or similar information to inform wireless devices of information relevant to that access node. The tracking area identifier can comprise a unique tracking area code (TAC) and a network identifier (NID). The unique tracking area code indicates the tracking area association of the access node. The network identifier indicates the network operator controlling the access node. Groups of access nodes controlled by the same network operator can be associated with different tracking area codes, and the tracking area identifier of each group of access nodes can comprise the same network identifier and a different tracking area code. FIG. 3A illustrates a wireless device 302 which moves within a tracking area associated with a tracking area identifier (TAI). The tracking area comprises a plurality of access nodes (not illustrated). The tracking area illustrated in FIG. 3 comprises three tracking area codes TAC1, TAC2 and TAC3. As an example, a network operator may configure a tracking area with tracking area codes in an environment where a relatively large number of wireless devices is detected or anticipated, such as an urban environment.

The tracking area illustrated in FIG. 3 also comprises two channels, each associated with a different network operator. For example, the first channel is associated with a first network identifier NID1, and the second channel is associated with a second network identifier NID 2. For example, in a network such as a multi-operator network (for example, a multi-operator core network (MOCN)), where different network operators can cooperate to provide communication services to wireless devices, a wireless device may move from a first channel associated with a first network operator to a second channel associated with a second network operator. Since the tracking area identifier comprises a tracking area code and a network identifier, as wireless device 302 move between channels associated with NID1 and NID2, wireless device 302 receives a different tracking area identifier, and typically will send a TAU to indicate that wireless device 302 has moved to a new tracking area.

Where wireless device 302 frequently changes communication between the first network and the second network, wireless device 302 may receive different tracking area identifiers relatively frequently, and consequently may send TAUs relatively frequently, each time wireless device 302 receives a new tracking area identifier. Accordingly, returning to FIG. 2, in operation 202, tracking area update messages are monitored, where the tracking area update messages are received from a wireless device when the wireless device changes between communicating over a first channel associated with a first tracking area identifier comprising a unique tracking area code and a first network identifier and communicating over a second channel associated with a second tracking area identifier comprising the unique tracking area code and a second network identifier.

In operation 204, it is determined that a number of the tracking area update messages received from the wireless device meets a message threshold. For example, it can be determined that a number of TAUs received from wireless device 102 meet a threshold number of TAUs. The threshold number of TAUs can be provided in communication system 100 and can be determined, for example, by access node 104 or another network element of communication system 100 such as a mobility management entity (MME), a gateway node, and the like (not illustrated). It can also be determined that, while the tracking area identifiers received by the wireless device are different, the difference results from the different network identifiers NID1 and NID2, and not from a different tracking area code. For example, referring to FIG. 3, while wireless device 302 may receive different tracking area identifiers, the received tracking area identifiers comprise the same tracking area code TAC2.

Returning to FIG. 2, in operation 206, the wireless device is instructed to not send a next tracking area update message when the number of tracking area update messages received from the wireless device meets the message threshold. For example, when it is determined that a number of TAUs received from wireless device 102 meets a threshold number of TAUs, wireless device 102 can be instructed not to send further TAUs where the tracking area codes in the received tracking area identifiers are the same. Thus, while a wireless device may change from communicating between communication networks with a relatively high frequency, a number of TAUs from the wireless device can be reduced while the wireless device remains within the same tracking area code.

Figure 4:
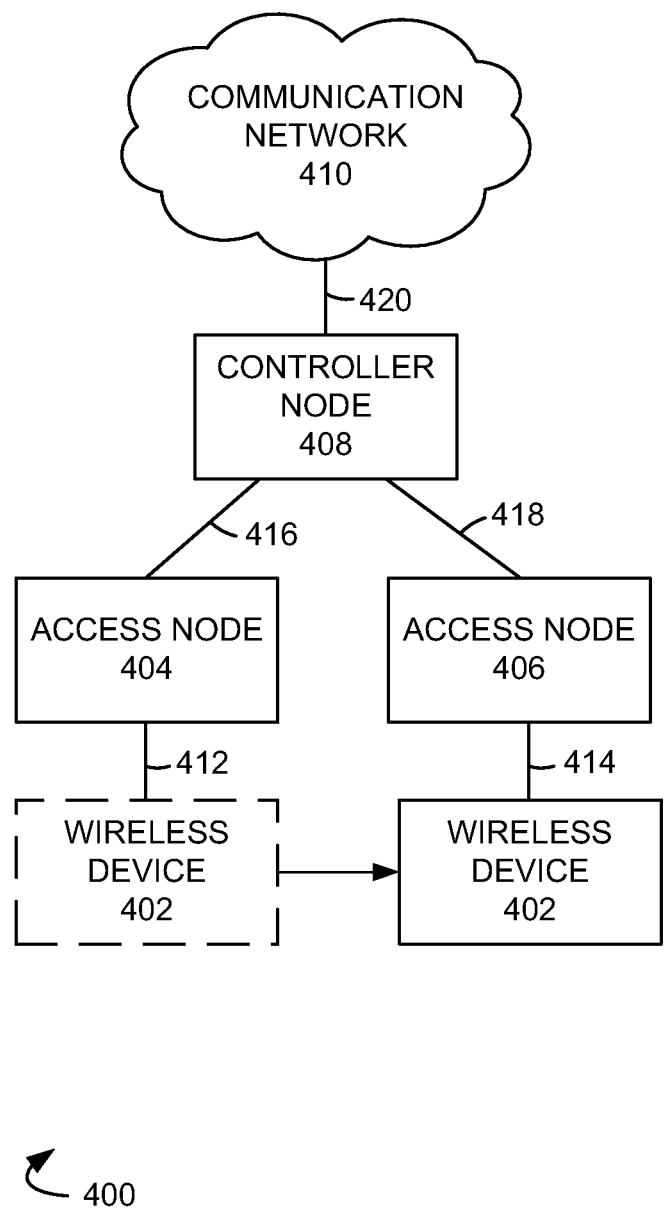
FIG. 4 illustrates another exemplary communication system for managing tracking area updates.

FIG. 4 illustrates another exemplary communication system 400 for managing tracking area updates comprising wireless device 402, access nodes 404 and 406, controller node 408, and communication network 410. Examples of wireless device 402 can comprise a cell phone, a smart phone, a computing platform such as a laptop, palmtop, or tablet, a personal digital assistant, or an internet access device, including combinations thereof. Wireless device 402 can communicate with access node 404 over communication link 412 and with access node 406 over communication link 414.

Access nodes 404 and 406 are each a network node capable of providing wireless communications to wireless device 402, and can be, for example, a base transceiver station, a radio base station, an eNodeB device, or an enhanced eNodeB device. Access node 404 is in communication with controller node 408 over communication link 416, and access node 406 is in communication with controller node 408 over communication link 418. Access nodes 404 and 406 can each be a member of a group of access nodes such as a tracking area.

Controller node 408 is a network element which can comprise a processor and associated circuitry to execute or direct the execution of computer-readable instructions related to managing tracking area updates. Controller node 408 can retrieve and execute software from storage, which can include a disk drive, flash drive, memory circuitry, or some other memory device, and which can be local or remotely accessible. The software comprises computer programs, firmware, or some other form of machine- readable instructions, and may include an operating system, utilities, drivers, network interfaces, applications, or some other type of software, including combinations thereof. Controller node 408 can receive instructions and other input at a user interface. Examples of controller node 408 can include a standalone computing device, a computer system, or a network component, such as a mobility management entity (MME), a mobile switching center (MSC), a call session control function (CSCF), and the like. Controller node is in communication with communication network 410 over communication link 420.

Communication network 410 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 410 can be capable of carrying voice and other information, for example, to support voice and data communications by a wireless device such as wireless device 402. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 410 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 410 may also comprise additional base stations, controller nodes, telephony switches, internet routers, network gateways, computer systems, communication links, or some other type of communication equipment, and combinations thereof.

Communication links 412, 414, 416, 418 and 420 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 404 and 406, controller node 408 and communication network 410 which are omitted for clarity, including additional processing nodes, routers, gateways, and physical and/or wireless data links for carrying data among the various network elements.

Figure 5:
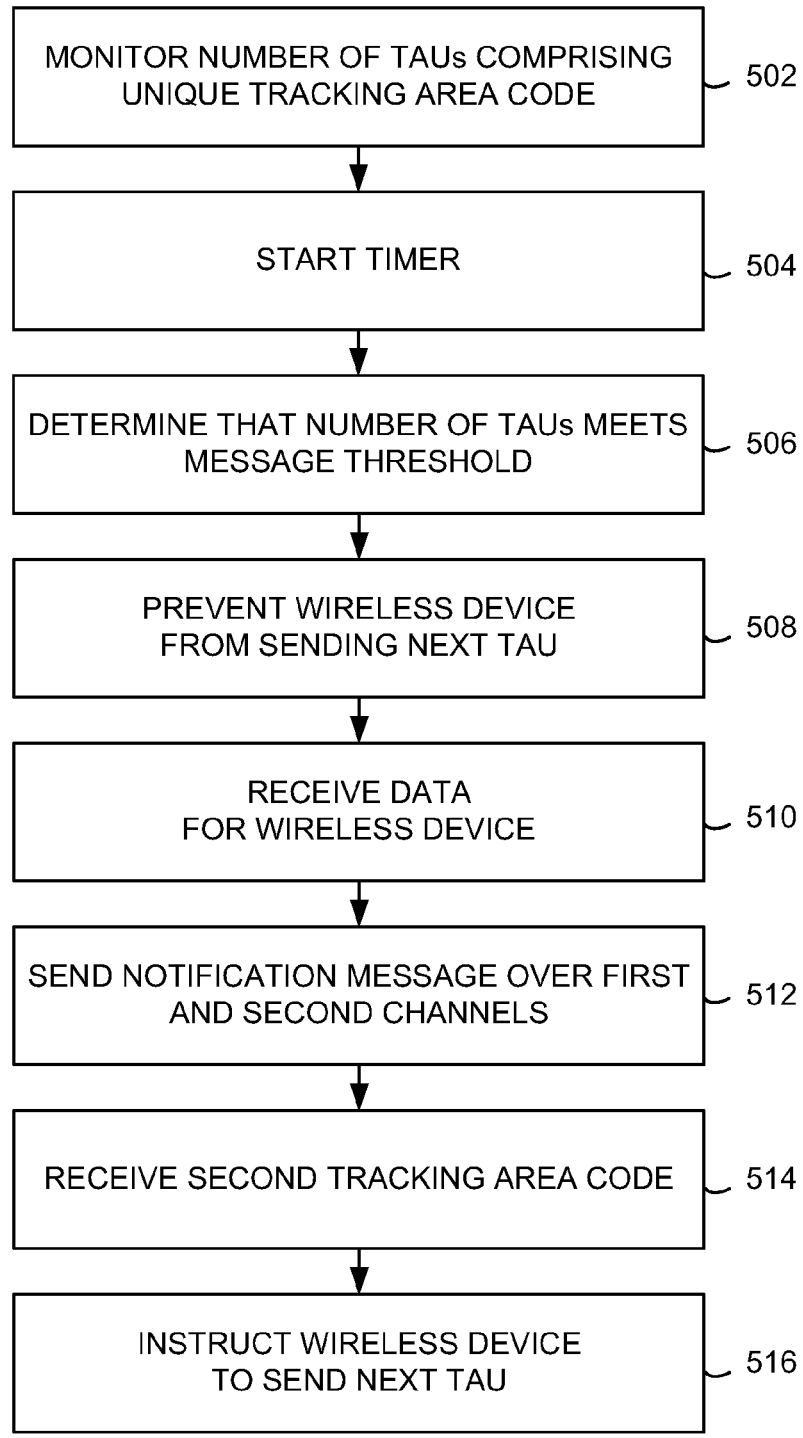
FIG. 5 illustrates another exemplary method of tracking area adjustment.

FIG. 5 illustrates another exemplary method of tracking area adjustment. In operation 502, tracking area update messages are received from a wireless device. For example, a TAU from wireless device 402 can be received when wireless device 402 changes between communicating over a first channel (communication link 412) associated with a first tracking area identifier comprising a unique tracking area code and a first network identifier and communicating over a second channel (communication link 414) associated with a second tracking area identifier comprising the unique tracking area code and a second network identifier. A TAU can be received from wireless device 402 whether it moves from communicating with access node to 404 to communicating with access node 406, or vice versa. Typically, wireless device 402 sends a TAU when it is idle mode and moves to a coverage area of a new access node, such as through a process of cell reselection or a similar process. In an embodiment, the first channel is associated with a first network operator and the second channel is associated with a second network operator.

Each of access nodes 404 and 406 typically transmits a tracking area identifier or similar information to inform wireless devices of information relevant to that access node. The tracking area identifier can comprise a unique tracking area code and a network identifier. The unique tracking area code indicates the tracking area association of the access node. The network identifier indicates the network operator controlling the access node. Groups of access nodes controlled by the same network operator can be associated with different tracking area codes, and the tracking area identifier of each group of access nodes can comprise the same network identifier and a different tracking area code.

In operation 504, a timer is started to time a predetermined time period. In an embodiment, tracking area updates of wireless device 402 can be monitored within the predetermined time period. The timer can run at, or be started at the direction of, controller node 408, or another network element of communication system 400.

In operation 506, it is determined that a number of the tracking area update messages received from the wireless device meets a message threshold. For example, it can be determined that a number of TAUs received from wireless device 402 meet a threshold number of TAUs. The threshold number of TAUs can be provided in communication system 400 (for example, at controller node 408) and can be determined, for example, by access node 404, access node 406, controller node 408, or another network element of communication system 400 such as a gateway node and the like (not illustrated). It can also be determined that the difference in tracking area identifiers is due to a difference in tracking area codes.

In operation 508, the wireless device is prevented from sending a next tracking area update when the number of tracking area update messages received from the wireless device meets the message threshold. For example, when it is determined that a number of TAUs received from wireless device 402 meets a threshold number of TAUs, wireless device 402 can be instructed not to send further TAUs when the tracking area codes in the received tracking area identifiers are the same. Thus, while wireless device 402 may change from communicating between communication networks with a relatively high frequency, a number of TAUs from wireless device 402 can be reduced while wireless device 402 remains within the same tracking area code. In an embodiment, wireless device 402 can be instructed to not send the next tracking area update message. The instruction can be received from controller node 408 or another network element of communication system 400, or the instruction can be generated at wireless device 402.

In operation 510, data can be received at a processing node for the wireless device, and in operation 512, a notification message is sent over the first channel and the second channel to the wireless device to notify the wireless device about the received data. For example, data can be received at controller node 408 (or another network element, such as a gateway node) for wireless device 402. Further, controller node 408 can send, or can instruct the sending, of a notification message to wireless device 402. The notification message can be sent over the first channel and the second channel. Further, the notification message can be sent over the first channel and the second channel when the wireless device has been instructed to not send a next tracking area update message. That is, controller node 408 or another network element of communication system 400 can store an indicator that wireless device 402 has been prevented from sending the next tracking area update, and when data is received for wireless device 402, based on the stored indicator, the notification message can be sent over both the first channel and the second channel.

In operation 514, a second tracking area code can be received by the wireless device. For example, wireless device 402 can change to communicating with an access node which provides a different tracking area code (such as TAC1 or TAC3, as illustrated in FIG. 3). When wireless device 402 receives a tracking area identifier comprising a different tracking area code, wireless device 402 can send a TAU via the new access node. In operation 516, the wireless device is instructed to send the next tracking area update message based on the second tracking area code. The instruction can be received from controller node 408 or another network element of communication system 400, or the instruction can be generated at wireless device 402. In an embodiment, the first tracking area code and the second tracking area code are associated with the same tracking area identifier.

Figure 6:
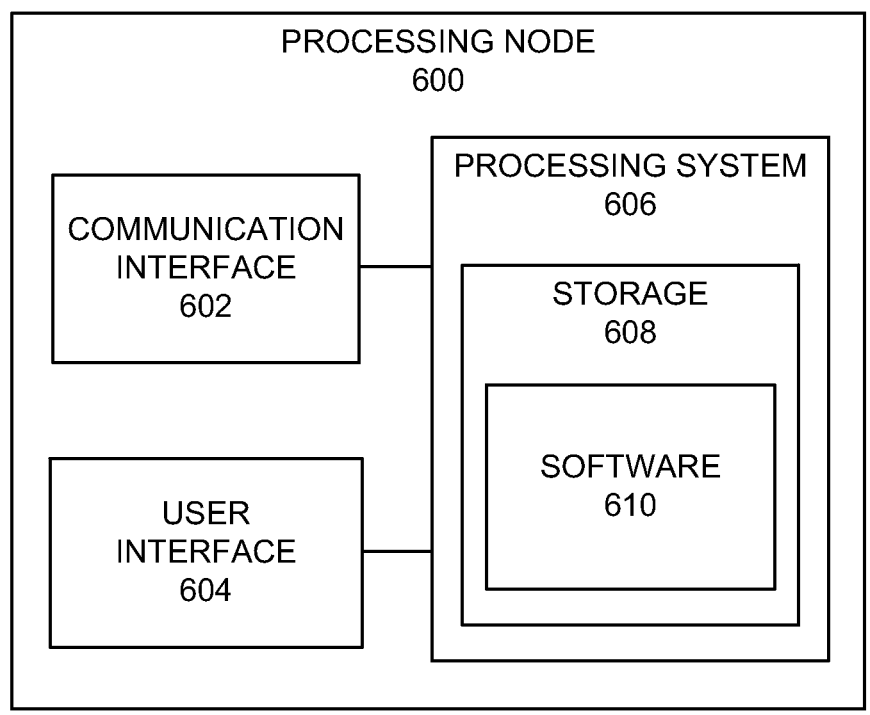
FIG. 6 illustrates an exemplary processing node.

FIG. 6 illustrates an exemplary processing node 600 in a communication system. Processing node 600 comprises communication interface 602, user interface 604 and processing system 606 in communication with communication interface 602 and user interface 604. Processing node 600 is configured to manage tracking area updates. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408, and access nodes 104, 404 and 406. Processing node 600 can also be an adjunct or component of a network element, such as an element of access node 104, 404, 406, or controller node 408. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing tracking area updates, comprising:
   monitoring tracking area update messages received from a wireless device when the wireless device changes between communicating over a first channel associated with a first tracking area identifier comprising a unique tracking area code and a first network identifier and communicating over a second channel associated with a second tracking area identifier comprising the unique tracking area code and a second network identifier;
   instructing the wireless device to not send a next tracking area update message when a number of the tracking area update messages received from the wireless device meets a message threshold; and
   sending a paging message over the first channel and the second channel to the wireless device to notify the wireless device about the data packet when the wireless device has been instructed to not send a next tracking area update message.

2. The method of claim 1, further comprising instructing the wireless device to not send a next tracking area update message when a number of the tracking area messages sent by the wireless device meets a message threshold during a predetermined time period.

3. The method of claim 1, further comprising:
   determining that the unique tracking area does not change during the predetermined time period; and
   instructing the wireless device to not send a next tracking area update message when unique tracking area does not change during the predetermined time period and the number of the tracking area messages sent by the wireless device meets a message threshold during a predetermined time period.

4. The method of claim 1, further comprising:
   receiving at a processing node a data packet for the wireless device; and
   sending a paging message over the first channel and the second channel to the wireless device to notify the wireless device about the data packet.

5. The method of claim 1, further comprising:
   receiving at the wireless device a third tracking area identifier comprising a second unique tracking area code and one of the first network identifier and the second network identifier; and
   instructing the wireless device to send the next tracking area update message based on the third tracking area identifier.

6. The method of claim 1, wherein the first channel is associated with a first network operator and the second channel is associated with a second network operator.

7. A method of managing tracking area updates, comprising:
   receiving tracking area update messages from a wireless device when the wireless device changes between communicating over a first channel associated with a first tracking area code and a first network identifier and communicating over a second channel associated with the first tracking area code and a second network identifier;
   preventing the wireless device from sending a next tracking area update message when a number of the tracking area messages received from the wireless device meets a message threshold; and
   sending a paging message over the first channel and the second channel to the wireless device to notify the wireless device about the data packet when the wireless device has been prevented from sending the next tracking area update message.

8. The method of claim 7, further comprising preventing the wireless device from sending a next tracking area update message when a number of the tracking area messages sent by the wireless device meets a message threshold during a predetermined time period.

9. The method of claim 8, further comprising:
   determining that the unique tracking area does not change during the predetermined time period; and
   preventing the wireless device from sending a next tracking area update message when unique tracking area does not change during the predetermined time period and the number of the tracking area messages sent by the wireless device meets a message threshold during a predetermined time period.

10. The method of claim 7, further comprising:
    receiving at a processing node a data packet for the wireless device; and
    sending a paging message over the first channel and the second channel to the wireless device to notify the wireless device about the data packet.

11. The method of claim 7, further comprising:
    receiving at the wireless device a second tracking area code; and
    instructing the wireless device to send the next tracking area update message based on the second tracking area code.

12. The method of claim 11, wherein the first tracking area code and the second tracking area code are associated with a same tracking area identifier.

13. The method of claim 7, wherein the first channel is associated with a first network operator and the second channel is associated with a second network operator.

14. A system for managing tracking area updates, comprising:
    a processing node, configured to
    monitor tracking area update messages received from a wireless device when the wireless device changes between communicating over a first channel associated with a first tracking area identifier comprising a unique tracking area code and a first network identifier and communicating over a second channel associated with a second tracking area identifier comprising the unique tracking area code and a second network identifier;

instruct the wireless device to not send a next tracking area update message when a number of the tracking area update messages received from the wireless device meets a message threshold; and send a paging message over the first channel and the second channel to the wireless device to notify the wireless device about the data packet when the wireless device has been instructed to not send a next tracking area update message.

15. The system of claim 14, wherein the processing node is further configured to instruct the wireless device to not send a next tracking area update message when a number of the tracking area messages sent by the wireless device meets a message threshold during a predetermined time period.

16. The system of claim 14, wherein the processing node is further configured to:

determine that the unique tracking area does not change during the predetermined time period; and instruct the wireless device to not send a next tracking area update message when unique tracking area does not change during the predetermined time period and the number of the tracking area messages sent by the wireless device meets a message threshold during a predetermined time period.

17. The system of claim 14, wherein the processing node is further configured to:

receive at a processing node a data packet for the wireless device; and send a paging message over the first channel and the second channel to the wireless device to notify the wireless device about the data packet.

* * * * *